US012782536B2

(12) United States Patent
Futagi et al.

(10) Patent No.: US 12,782,536 B2
(45) Date of Patent: Nov. 3, 2026

(54) WIRELESS DEVICE AND METHOD FOR CONTROLLING WIRELESS DEVICE

(71) Applicant: ALPS ALPINE CO., LTD., Tokyo (JP)

(72) Inventors: Yuki Futagi, Miyagi (JP); Yukimitsu Yamada, Miyagi (JP); Daisuke Takai, Tokyo (JP); Hongyuan Chen, Miyagi (JP); Takeo Sato, Miyagi (JP); Akihiro Abe, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 253 days.

(21) Appl. No.: 18/647,369

(22) Filed: Apr. 26, 2024

(65) Prior Publication Data

US 2024/0272291 A1 Aug. 15, 2024

Related U.S. Application Data

(63) Continuation of application No. PCT/JP2022/038184, filed on Oct. 13, 2022.

(30) Foreign Application Priority Data

Nov. 30, 2021 (JP) ................................ 2021-193984

(51) Int. Cl.
*G01S 11/10* (2006.01)
*G01S 11/04* (2006.01)

(52) U.S. Cl.
CPC ............... *G01S 11/10* (2013.01); *G01S 11/04* (2013.01)

(58) Field of Classification Search
CPC ................................ G01S 11/10; G01S 11/04
See application file for complete search history.

(56) References Cited

U.S. PATENT DOCUMENTS

| | | | | |
|---|---|---|---|---|
| 2015/0268350 A1* | 9/2015 | Whitehead | G01S 3/46 342/357.59 |
| 2018/0007078 A1 | 1/2018 | Motos et al. | |
| 2020/0119463 A1 | 4/2020 | Stitt et al. | |
| 2021/0157013 A1* | 5/2021 | Lyusin | H04W 4/027 |
| 2021/0366213 A1 | 11/2021 | Hadaschik et al. | |

FOREIGN PATENT DOCUMENTS

| | | |
|---|---|---|
| JP | 2019-533096 | 11/2019 |
| JP | 2021-528301 | 10/2021 |
| WO | 2020/077231 | 4/2020 |

OTHER PUBLICATIONS

International Search Report for PCT/JP2022/038184 mailed on Jan. 10, 2023.

* cited by examiner

*Primary Examiner* — Curtis B Odom
(74) *Attorney, Agent, or Firm* — IPUSA, PLLC

(57) ABSTRACT

A wireless device includes a transmitter; a receiver; and a control device configured to obtain a first difference of a predetermined physical quantity, in a unit time, of a predetermined-frequency signal transmitted by the transmitter to another device, and calculate a second difference of the predetermined physical quantity, in the unit time, of the predetermined-frequency signal received by the another device, based on a signal received by the receiver; and perform a determination process of comparing the first difference and the second difference to determine legitimacy of the signal received by the receiver.

8 Claims, 7 Drawing Sheets

WIRELESS DEVICE AND METHOD FOR CONTROLLING WIRELESS DEVICE

CROSS-REFERENCE TO RELATED APPLICATIONS

This application is a continuation application of International Application No. PCT/JP2022/038184 filed on Oct. 13, 2022, and designating the U.S., which is based upon and claims priority to Japanese Application No. 2021-193984, filed on Nov. 30, 2021, the entire contents of which are incorporated herein by reference.

BACKGROUND

1. Technical Field

The present disclosure relates to a wireless device and a method for controlling the wireless device.

2. Description of the Related Art

There is a method for relay attack resistant communication. In the method for the relay attack resistant communication, a master wireless device that transmits a synchronization signal to a slave wireless device is included, the synchronization signal includes timing information, and the timing information includes a common time reference and a time slot duration for coordinating master and slave communication time slots so that alternating TX and RX roll patterns are provided to the master and to the slave. The master analyzes slave packet data received from the slave to identify an overlap of transmissions from the master and slave packet data, which is a packet error, and in the case of the packet error, the communication from the master to the slave is interrupted to prevent a relay attack (for example, see Patent Document 1).

RELATED ART DOCUMENT

Patent Document

Patent Document 1: Japanese National Publication of International Patent Application No. 2019-533096

SUMMARY

According to one embodiment of the present disclosure, a wireless device includes a transmitter; a receiver; and a control device configured to obtain a first difference of a predetermined physical quantity, in a unit time, of a predetermined-frequency signal transmitted by the transmitter to another device, and calculate a second difference of the predetermined physical quantity, in the unit time, of the predetermined-frequency signal received by the another device, based on a signal received by the receiver; and perform a determination process of comparing the first difference and the second difference to determine legitimacy of the signal received by the receiver.

DETAILED DESCRIPTION

In a method for the relay attack resistant communication, the packet error is detected by using a common time reference and a time slot duration for coordinating the master and slave communication time slots. Therefore, for example, in a case where a master device serving as "master" changes a phase of a transmission signal to be transmitted to a slave device serving as "slave", if an illegitimate slave device receives a transmission signal and impersonates a legitimate slave device by changing a phase of the transmission signal, the illegitimate slave device cannot be detected. The relay attack method for changing the phase of the transmission signal and impersonating a legitimate slave device is called early detect late commitment (EDLC).

A wireless device that can detect a relay attack of impersonating a legitimate device by changing a phase of a reception signal, and a method for controlling the wireless device can be provided.

In the following, an embodiment in which a wireless device and a method for controlling the wireless device of the present disclosure are applied will be described.

EMBODIMENT

Figure 1:
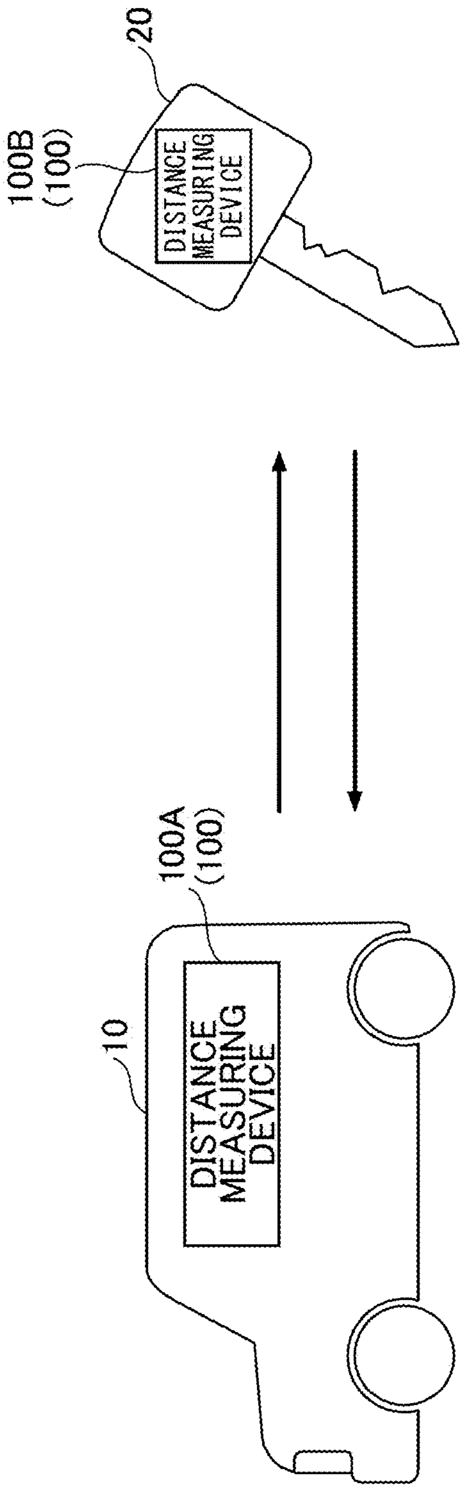
FIG. 1 is a diagram illustrating a vehicle and a smart key each implementing a distance measuring device including a wireless device according to an embodiment.

FIG. 1 is a diagram illustrating a vehicle 10 and a smart key 20 in which distance measuring devices 100A and 100B including wireless devices according to the embodiment are implemented, respectively. Here, as an example, a configuration in which the distance measuring device 100A is implemented in a smart entry system mounted in the vehicle 10 and the distance measuring device 100B is implemented in the smart key 20 of the vehicle 10 will be described. The distance measuring devices 100A and 100B perform packet communication by Bluetooth Low Energy (BLE), for example.

At least either the distance measuring device 100A of the vehicle 10 or the distance measuring device 100B of the smart key 20 measures a distance between the vehicle 10 and the smart key 20, and locks of a door, a trunk, and the like of the vehicle 10 are unlocked when the distance measured by the distance measuring device 100A or 100B is an appropriate distance.

Here, as an example, it is assumed that the distance measuring device 100A of the vehicle 10 performs distance measuring, and notifies the distance measuring device 100B of the smart key 20 of a result of the distance measuring. The distance measuring devices 100A and 100B have the same configuration, as an example. Therefore, in the following description, when the distance measuring devices 100A and 100B are not distinguished, they are simply referred to as a distance measuring device 100. The distance measuring device 100B that does not perform distance measuring among the distance measuring device 100A of the vehicle 10 and the distance measuring device 100B of the smart key 20 is an example of another device. It is noted that it is possible to handle the distance measuring device 100A as a master device and the distance measuring device 100B as a slave device, or conversely, to handle the distance measuring device 100B as a master device and the distance measuring device 100A as a slave device, but here, description will be given without such handling.

Configuration of Distance Measuring Device 100A

Figure 2:
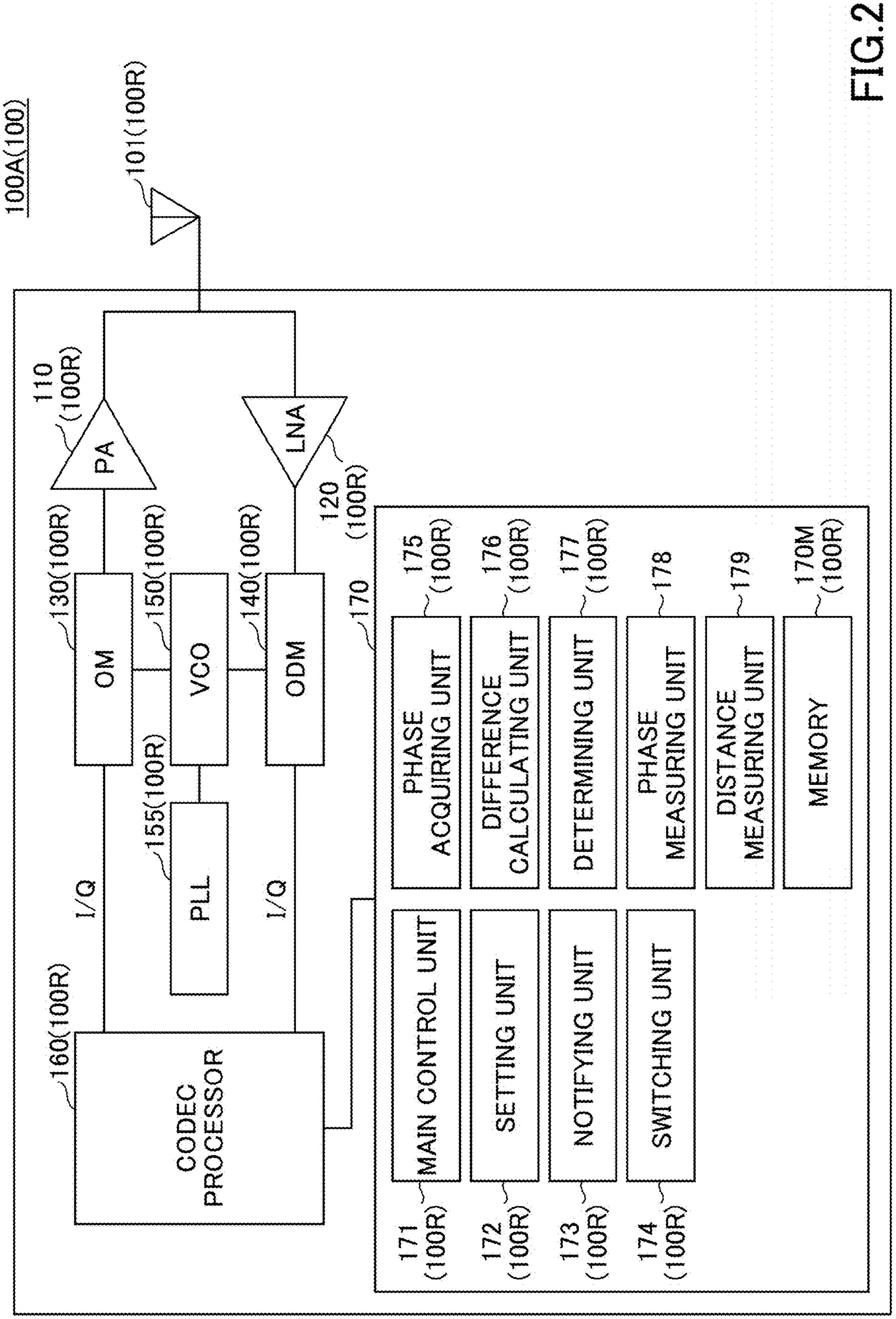
FIG. 2 is a diagram illustrating the distance measuring device of the embodiment.

FIG. 2 is a diagram illustrating the distance measuring device 100A of the embodiment. As described above, the distance measuring device 100A of the vehicle 10 and the distance measuring device 100B of the smart key 20 have the same configuration. Here, the distance measuring device 100A that performs the distance measuring will be described. Additionally, the distance measuring device 100A includes a wireless device 100R of the embodiment. The components included in the wireless device 100R are denoted by a reference symbol 100R in parentheses.

The distance measuring device 100A includes an antenna 101, a power amplifier (PA) 110, a low noise amplifier (LNA) 120, an orthogonal modulator (OM) 130, an orthogonal demodulator (ODM) 140, a voltage controlled oscillator (VCO) 150, a phase locked loop (PLL) 155, a codec processor 160, and a control device 170. The wireless device 100R includes components other than a phase measuring unit 178 and a distance measuring unit 179 of the control device 170 among the components of the distance measuring device 100A. Therefore, the reference symbol 100R is written in parentheses for the components other than the phase measuring unit 178 and the distance measuring unit 179 of the control device 170 among the components of the distance measuring device 100A.

The antenna 101 performs communication with the antenna 101 of the distance measuring device 100B in the smart key 20. The antenna 101 is connected to the PA 110 and the LNA 120. Here, a switch for switching the connection destination of the antenna 101 to either the PA 110 or the LNA 120 is omitted.

The PA 110 is provided between the OM 130 and the antenna 101, and amplifies a modulated signal for transmission that is input from the OM 130 and outputs the amplified signal to the antenna 101. The PA 110 is an amplifier for transmission.

The LNA 120 is provided between the antenna 101 and the ODM 140, and amplifies a radio wave received by the antenna 101 with low noise and outputs the amplified radio wave to the ODM 140. The LNA 120 is an amplifier for reception.

The OM 130 is an example of a transmitter, and modulates an I/Q signal input from the codec processor 160 by using a high-frequency signal input from the VCO 150, and outputs the modulated signal to the PA 110 as a modulated signal for transmission.

The ODM 140 is an example of a receiver, and demodulates a signal output from the LNA 120 by using a high-frequency signal input from the VCO 150 to obtain the I/Q signal, and outputs the I/Q signal to the codec processor 160. The signal output from the LNA 120 is a signal received by the distance measuring device 100A from the distance measuring device 100B.

The VCO 150 oscillates at the frequency set by the PLL 155. The VCO 150 can oscillate at multiple frequencies set by the PLL 155.

The PLL 155 sets the frequency at which the VCO 150 oscillates. The PLL 155 can set multiple frequencies in the VCO 150.

The codec processor 160 includes an analog to digital converter (ADC) and a digital to analog converter (DAC), and performs codec processing. The codec processor 160 performs detection of a BLE (registered trademark) packet, address determination processing, and the like. More specifically, the codec processor 160 performs digital conversion (ADC processing) on the I/Q signal processed in the ODM 140, and converts the I/Q signal into the packet information of BLE. Additionally, the codec processor 160 generates the I/Q signal (divides an I signal and a Q signal) from a BLE packet (digital signal) input from the control device 170, converts the I/Q signal into an analog signal by DAC processing, and outputs the analog signal to the OM 130 as the I/Q signal serving as a transmission signal.

In the following, a predetermined-frequency signal that is transmitted from the OM 130 of the distance measuring device 100A to the distance measuring device 100B is referred to as a transmission signal. Additionally, a signal transmitted as the transmission signal by the distance measuring device 100A and received by another device is referred to as a reception signal.

The control device 170 includes a main control unit 171, a setting unit 172, a notifying unit 173, a switching unit 174, a phase acquiring unit 175, a difference calculating unit 176, a determining unit 177, the phase measuring unit 178, the distance measuring unit 179, and a memory 170M. The memory 170M is an example of a storage unit. The control device 170 is implemented by a microcomputer including a central processing unit (CPU), a random access memory (RAM), a read only memory (ROM), an input/output interface, an internal bus, and the like.

The main control unit 171, the setting unit 172, the notifying unit 173, the switching unit 174, the phase acquiring unit 175, the difference calculating unit 176, the determining unit 177, the phase measuring unit 178, and the distance measuring unit 179 indicate functions of a program executed by the control device 170 as functional blocks. Additionally, the memory 170M functionally represents a memory of the control device 170.

The main control unit 171 is a processing unit that controls processing of the control device 170, and performs processing other than processing performed by the setting unit 172, the notifying unit 173, the switching unit 174, the phase acquiring unit 175, the difference calculating unit 176, the determining unit 177, the phase measuring unit 178, and the distance measuring unit 179.

The setting unit 172 sets the frequency (the predetermined frequency) and the phase of the signal to be transmitted from the distance measuring device 100A to the distance measuring device 100B. Additionally, the distance measuring device 100B transmits, to the distance measuring device 100A, a signal having a frequency the same as the frequency of the signal transmitted to the distance measuring device 100A. Here, the same frequency of the signal transmitted by the distance measuring devices 100A and 100B to each other may be determined in advance between the distance measuring devices 100A and 100B. Data representing the frequency may be shared by using the BLE packet communication.

The notifying unit 173 notifies the notifying unit 173 of the distance measuring device 100B in the smart key 20 of the result of the distance measuring. For the notification, a BLE packet communication having a frequency different from that of the communication for the distance measuring is used. In the notification, the result of the distance measuring and the like may be written in a payload of the BLE packet.

The switching unit 174 switches between a transmission state in which the OM 130 transmits the signal and a reception state in which the ODM 140 receives the signal. The switching unit 174 allows the PA 110 to amplify the signal in the transmission state and allows the LNA to amplify the signal in the reception state. The switching unit 174 provides a stabilization time for stabilizing the phase and the frequency when switching between the transmission state and the reception state.

The phase acquiring unit 175 acquires, from the distance measuring device 100B, the phase when the distance measuring device 100B receives the predetermined-frequency transmission signal that is transmitted by the distance measuring device 100A, as the reception signal. The phase acquiring unit 175 acquires data representing the phase from the distance measuring device 100B by the BLE packet communication having a frequency different from that of the communication for the distance measuring. The data representing the phase may be written in the payload of the BLE packet. Additionally, the data representing the phase may be measured by the phase measuring unit 178 of the distance measuring device 100B and transmitted to the distance measuring device 100A.

The difference calculating unit 176 obtains a first difference of the phase of the predetermined-frequency transmission signal transmitted by the OM 130 to the distance measuring device 100B, and calculates a second difference of the phase of the predetermined-frequency reception signal received by another device, using the data representing the phase acquired by the phase acquiring unit 175 based on the signal received by the ODM 140. The phase is an example of a predetermined physical quantity.

Another device is either the distance measuring device 100B or the illegitimate device. The distance measuring device 100B is a legitimate device having legitimate access authority to the distance measuring device 100A. The illegitimate device is a device that impersonates the distance measuring device 100B, which is the legitimate device, and is a device that does not have legitimate access authority to the distance measuring device 100A. The first difference and the second difference are used when determining the legitimacy of the device that is a transmission source having transmitted the signal received by the ODM 140. Methods for calculating the first difference and the second difference will be described later with reference to FIG. 3 and FIG. 4.

The determining unit 177 performs a determination process of comparing the first difference and the second difference calculated by the difference calculating unit 176, to determine the legitimacy of the signal received by the ODM 140. The determination of the legitimacy by the determining unit 177 indicates that the determining unit 177 determines the legitimacy of the device that is the transmission source having transmitted the signal received by the ODM 140. More specifically, the determining unit 177 determines whether the transmission source is the distance measuring device 100B or the illegitimate device impersonating the distance measuring device 100B.

The phase measuring unit 178 measures the phase when the distance measuring device 100A receives the predetermined-frequency signal from the distance measuring device 100B. This phase is measured for distance measuring. Therefore, the phase measuring unit 178 is not included in the components of the wireless device 100R.

The distance measuring unit 179 performs the distance measuring of the distance between the distance measuring device 100A and the distance measuring device 100B based on the phase of the transmission signal acquired by the phase acquiring unit 175, the phase measured by the phase measuring unit 178, and the number of waves of the transmission signal and the reception signal between the distance measuring device 100A and the distance measuring device 100B.

The memory 170M stores programs, data, and the like that are necessary for the main control unit 171, the setting unit 172, the notifying unit 173, the switching unit 174, the phase acquiring unit 175, the difference calculating unit 176, the determining unit 177, the phase measuring unit 178, and the distance measuring unit 179 of the control device 170 to perform the above-described processing. The memory 170M stores data and the like in which the predetermined frequency and phases of the signals to be transmitted to each other between the distance measuring devices 100A and 100B are set.

Phase of Transmission Signal and Phase of Illegitimate Reception Signal

Figure 3:
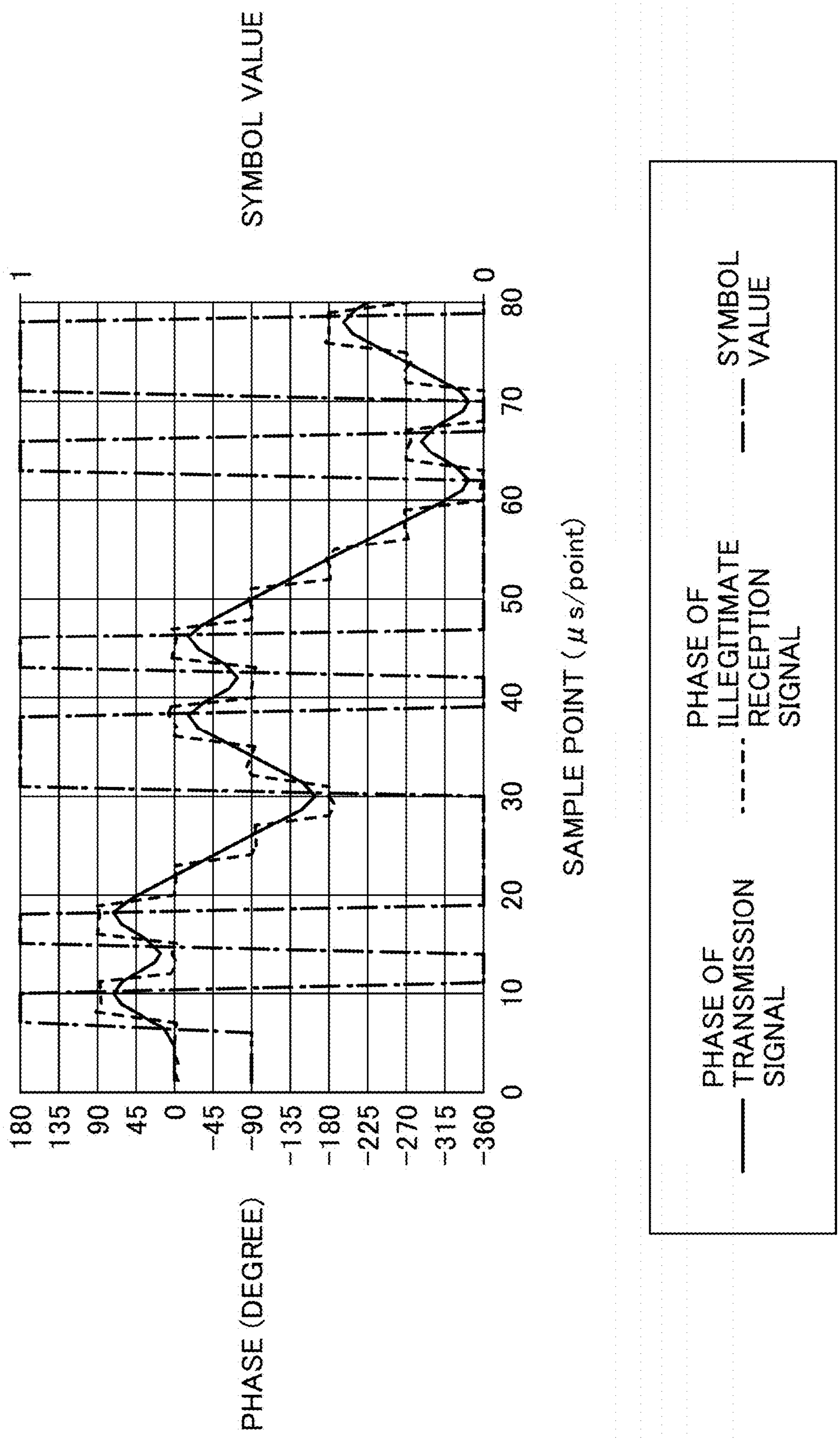
FIG. 3 is a graph for explaining a phase of a transmission signal and a phase of an illegitimate reception signal.

FIG. 3 is a graph for explaining the phase of the transmission signal and the phase of the illegitimate reception signal. The illegitimate reception signal is a reception signal whose phase is falsified by the illegitimate device. In FIG. 3, the horizontal axis represents a sample point (0.25 μs/point) at which sampling is performed, the vertical axis on the left side represents the phase (the degree), and the vertical axis on the right side represents a symbol value (0 or 1). The horizontal axis represents the sample point, and thus corresponds to a time axis.

In FIG. 3, the dash-dotted line indicates a symbol value (transmission symbol) of a BLE (registered trademark) packet (a digital signal) input from the control device 170 to the codec processor 160. Additionally, the solid line indicates the phase of the transmission signal, and the dashed line indicates the phase of the illegitimate reception signal.

As an example, when the symbol value of the BLE packet changes as illustrated in FIG. 3, the phase of the I/Q signal as the transmission signal generated based on the BLE packet changes as indicated by the solid line. Although not illustrated in FIG. 3, the phase of the reception signal of the legitimate distance measuring device 100B changes following the phase of the transmission signal indicated by the solid line, and therefore, has a waveform in which the reception signal is delayed by one sample point to several sample points with respect to the transmission signal.

The phase of the illegitimate reception signal indicated by the dashed line in FIG. 3 represents an example of the phase of the illegitimate reception signal that can be generated by a relay attack method called EDLC, for example. The EDLC is a method for estimating a transmission symbol of a reception signal, generating a reception signal having a phase rise timing earlier than that of the reception signal based on the estimated transmission symbol, storing it in a payload of a BLE packet, and transmitting the reception signal to the distance measuring device 100A. As described above, the EDLC attempts to perform a relay attack by falsifying the phase, causing the distance measuring device 100A to incorrectly calculate the distance between the illegitimate device and the distance measuring device 100A, and impersonating the legitimate distance measuring device 100B.

The phase of the illegitimate reception signal generated by the EDLC changes sharply so as to follow the symbol value of the BLE packet, and consequently, the phase of the illegitimate reception signal has a pattern that also follows the phase of the transmission signal. If the phase changes sharply in this way, it is not detected as a bit abnormality in the conventional method for the relay attack resistant communication.

Figure 4:
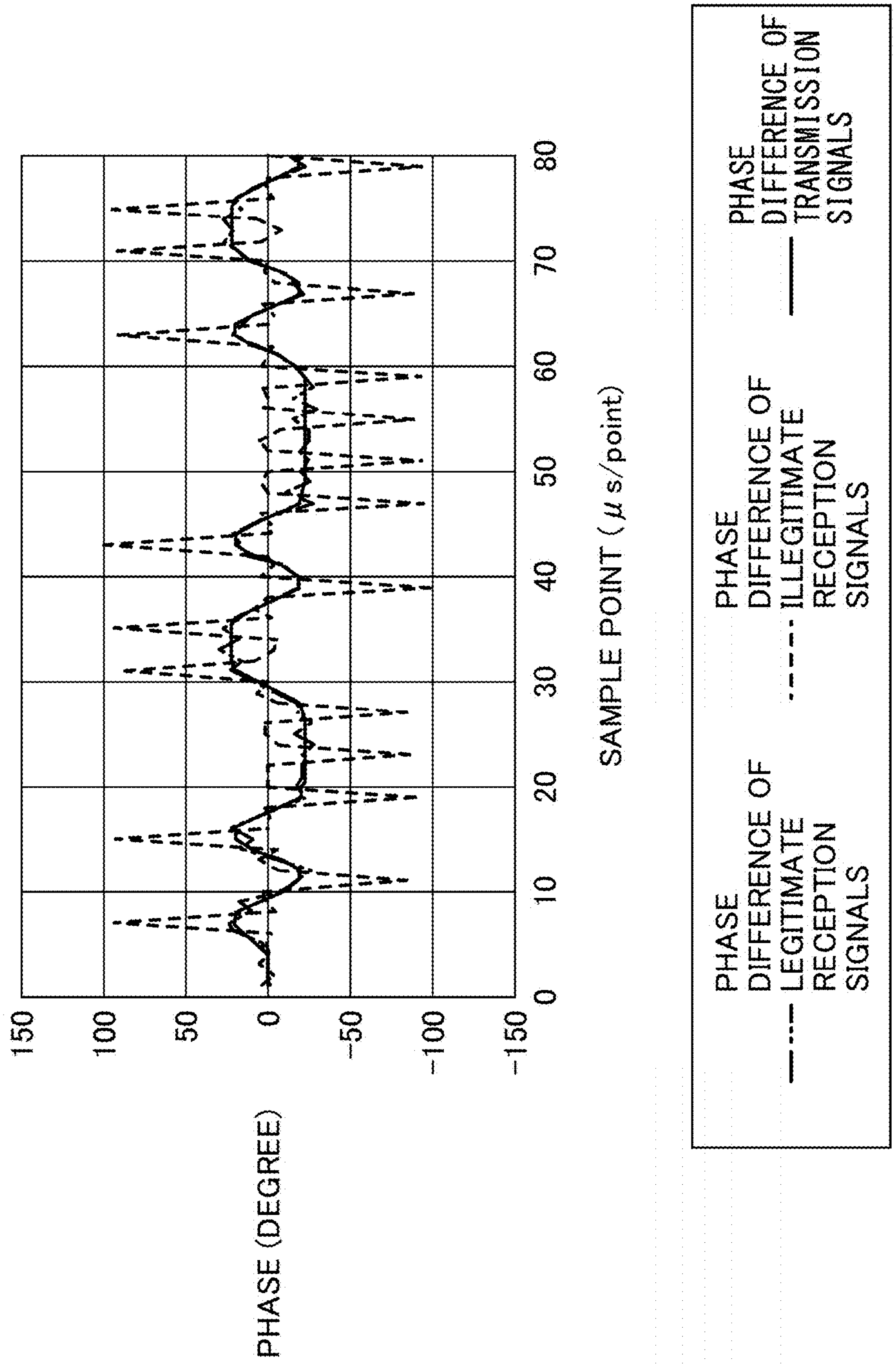
FIG. 4 is a graph indicating a phase difference of the transmission signal, a phase difference of a legitimate reception signal, and a phase difference of the illegitimate reception signal.

Phase Difference of Transmission Signal, Phase Difference of Legitimate Reception Signal, and Phase Difference of Illegitimate Reception Signal FIG. 4 is a graph indicating the phase difference of the transmission signal, the phase difference of the legitimate reception signal, and the phase difference of the illegitimate reception signal. The horizontal axis represents a sample point (0.25 μs/point) at which sampling is performed, and the vertical axis represents the phase difference (the degrees). The phase difference of the transmission signal is an example of a first difference, and the phase difference of the legitimate reception signal and the phase difference of the illegitimate reception signal are examples of a second difference.

In FIG. 4, the solid line indicates the phase difference of the transmission signal, the dash-dot-dot line indicates the phase difference of the legitimate reception signal, and the dashed line indicates the phase difference of the illegitimate reception signal.

The phase difference of the transmission signal is a difference (a phase difference) between a phase of the transmission signal and a phase sampled one cycle before in a sampling period. The sampling period is an example of a unit time, and such a phase difference of the transmission signal is a difference of the phase in the unit time (the first difference). That is, the phase difference of the transmission signal is a difference (a phase difference) between phases sampled in two consecutive sampling periods (two consecutive sample points) among the phases of the transmission signal repeatedly sampled in the distance measuring device 100A.

Similarly, the phase difference of the legitimate reception signal is a difference (a phase differences) between phases sampled in two consecutive sampling periods (two consecutive sample points) among the phases of the reception signal repeatedly sampled in the distance measuring device 100B.

Additionally, the phase difference of the illegitimate reception signal is a phase difference of the reception signal illegitimately generated by the illegitimate device impersonating the distance measuring device 100B based on the transmission signal of the distance measuring device 100A, and simulates a difference (a phase difference) between phases sampled in two consecutive sampling periods (two consecutive sample points) for the legitimate reception signal.

As illustrated in FIG. 4, the phase difference of the legitimate reception signal follows the phase difference of the transmission signal, and even if there is a delay with respect to the transmission signal, the delay is about one sample point to several sample points. The waveform of the phase difference of the legitimate reception signal is substantially the same as the waveform of the phase difference of the transmission signal.

In contrast, the phase difference of the illegitimate reception signal changes when the phase difference of the transmission signal changes, but the phase itself changes sharply as indicated in FIG. 3, and therefore the phase difference also changes sharply as indicated in FIG. 4.

As described, the phase difference of the legitimate reception signal and the phase difference of the illegitimate reception signal are completely different in the manner of change. The wireless device 100R and the distance measuring device 100A according to the embodiment determine whether it is the legitimate distance measuring device 100B or the illegitimate device based on such a difference in temporal change.

Data Structure of BLE Packet

Figure 5:
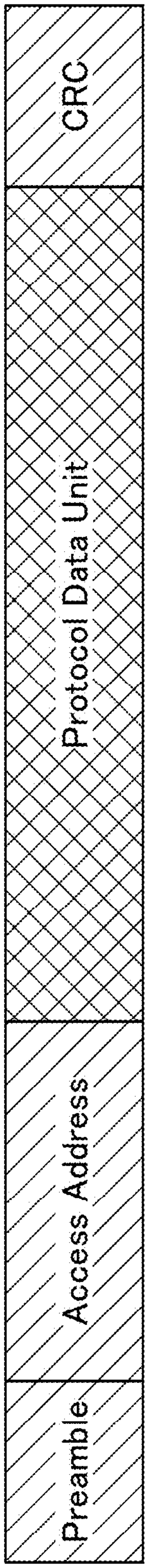
FIG. 5 is a diagram illustrating an example of a data structure of a BLE packet.

FIG. 5 is a diagram illustrating an example of a data structure of the BLE (registered trademark) packet. The BLE packet includes a preamble, an access address, a protocol data unit, and a CRC from the head. The protocol data unit includes areas, such as a header, a payload, and the like. As an example, the phase acquiring unit 175 of the distance measuring device 100B may acquire the data representing the phase and write the acquired data in the payload of the BLE packet. Here, as an example, as the data representing the phase, data obtained by setting a value in a high frequency section to 1 and setting a value in a low frequency section to 0 in frequency shift keying (FSK) modulation may be used.

Figure 6:
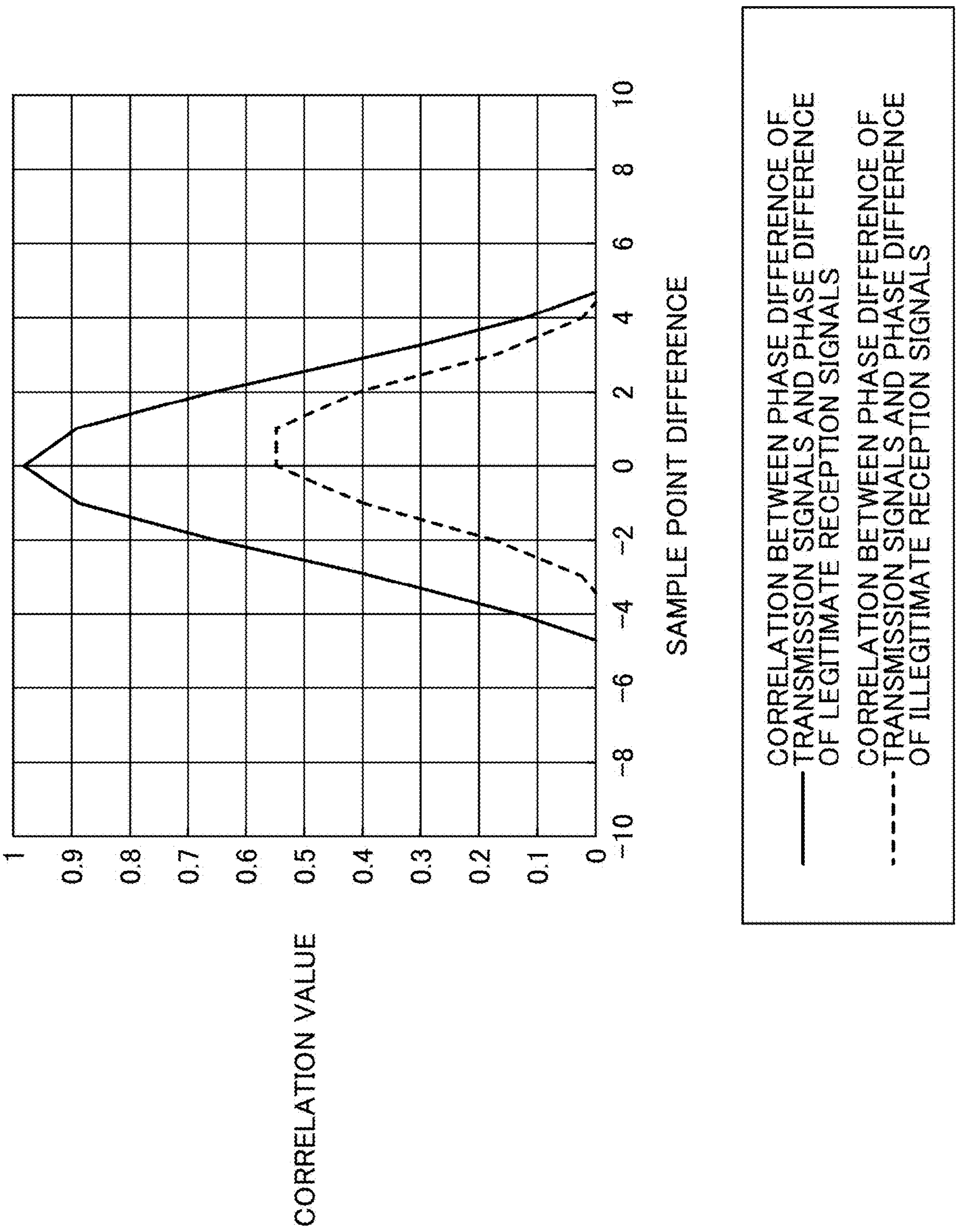
FIG. 6 is a graph for explaining a correlation between a phase difference of the transmission signal and a phase difference of the reception signal.

Correlation Between Phase Difference of Transmission Signal and Phase Difference of Reception Signal FIG. 6 is a graph for explaining a correlation between the phase difference of the transmission signal and the phase difference of the reception signal. In FIG. 6, the horizontal axis represents a difference between the sample points of the transmission signal and the reception signal, and the vertical axis represents a correlation value between the phase difference of the transmission signal and the phase difference of the reception signal. The difference between the sample points on the horizontal axis is the difference between the sample points at which the phases of the transmission signal and the reception signal are acquired, and the phase differences of the transmission signal and the reception signal is the phase differences obtained by subtracting, from the phase at each sample point, the phase at the sample point immediately before the sample point.

In FIG. 6, the solid line indicates an example of the correlation between the phase difference of the transmission signal of the distance measuring device 100A and the phase difference of the reception signal of the legitimate distance measuring device 100B, and the dashed line indicates an example of the correlation between the phase difference of the transmission signal of the distance measuring device 100A and the phase difference of the reception signal of the illegitimate device.

The correlation between the phase difference of the transmission signal of the distance measuring device 100A and the phase difference of the reception signal of the legitimate distance measuring device 100B has a maximum value close to 1 as indicated by the solid line. As described with respect to FIG. 4, because the waveform of the phase difference of the legitimate reception signal is substantially the same as the waveform of the phase difference of the transmission signal, a correlation characteristic having such a large maximum value can be obtained by shifting the sample point, for example, within the range of ±10. Here, in this case, because the peak of the phase difference exists within the range of ±10 of the sample point, the maximum value of the correlation can be obtained by shifting the sample point within the range of ±10. In order to obtain the maximum value of the correlation, it is only necessary to shift the sample point within a range in which the peak of the phase difference exists.

With respect to the above, the correlation between the phase difference of the transmission signal of the distance measuring device 100A and the phase difference of the reception signal of the illegitimate device has a low maximum value as indicated by the dashed line. This is because, as illustrated in FIG. 4, the phase difference of the reception signal of the illegitimate device changes sharply, and the waveform of the phase difference of the reception signal is completely different from the waveform of the phase difference of the transmission signal.

Therefore, for example, by performing determination on the maximum value of the correlation by using an appropriate threshold, it can be determined whether the phase difference is a phase difference of the reception signal of the legitimate distance measuring device 100B or a phase difference of the reception signal of the illegitimate device. Such determination may be performed by the determining unit 177 of the control device 170. The determining unit 177 may calculate the correlation as illustrated in FIG. 6, determine that the device is legitimate when the maximum value of the correlation is greater than or equal to a threshold value, and determine that the device is illegitimate when the maximum value of the correlation is less than the threshold value. Here, in the example of FIG. 6, the threshold value may be set to a value from 0.7 to 0.8, for example.

Process of Determining Whether Device is Illegitimate

Figure 7:
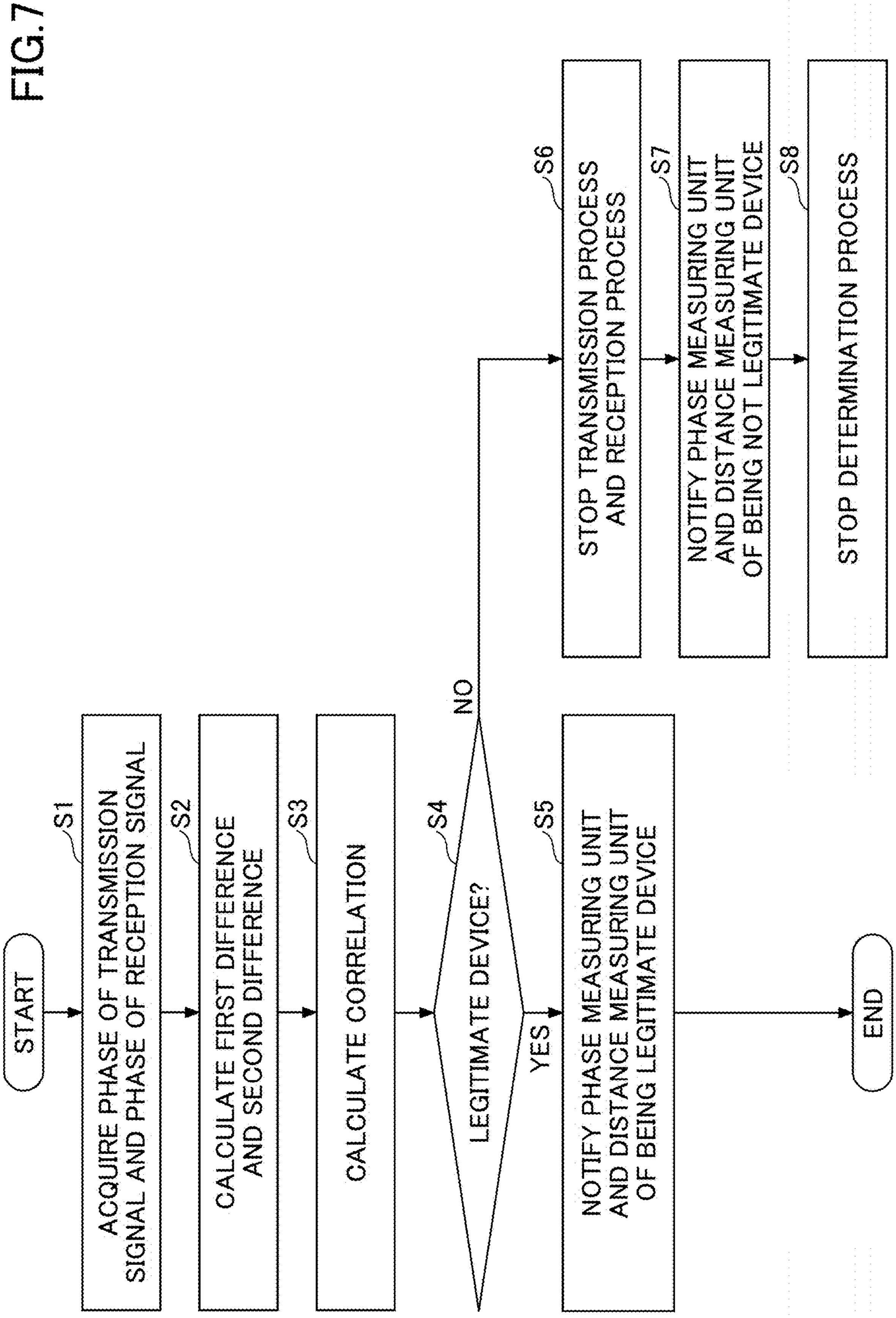
FIG. 7 is a flowchart illustrating a process performed by a control device to determine whether a device is illegitimate.

FIG. 7 is a flowchart illustrating a process performed by the control device 170 to determine whether the device is illegitimate. The process illustrated in FIG. 7 is a process for realizing a method for controlling the wireless device 100R.

First, when the process starts, the main control unit 171 causes the setting unit 172 to set the frequency (the predetermined frequency) and the phase of the signal to be transmitted, transmits the transmission signal, and acquires the phase of the transmission signal and the phase of the reception signal (step S1).

The difference calculating unit 176 calculates the first difference of the phase of the predetermined-frequency transmission signal transmitted from the OM 130 to the distance measuring device 100B in the unit time and the second difference of the phase of the predetermined-frequency reception signal received by the other device based on the signal received by the ODM 140 in the unit time (step S2).

The determining unit 177 calculates the correlation (step S3). In step S3, as illustrated in FIG. 6, the characteristic of the correlation having the maximum value may be obtained by shifting the sample point within the range of ±10, for example.

The determining unit 177 determines whether the device is legitimate (step S4). It may be determined whether the device is legitimate by determining whether the maximum value of the correlation is greater than or equal to the threshold value.

In response to determining that the device is legitimate (S4: YES), the determining unit 177 notifies the phase measuring unit 178 and the distance measuring unit 179 that the device is legitimate (step S5). When the processing of step S5 is ended, a series of processing is ended (end), and the process is performed again from start. That is, the determining unit 177 continues the determination process.

The phase measuring unit 178 and the distance measuring unit 179 measure the phase for the distance measuring and perform the distance measuring in response to being notified that the device is legitimate.

In response to determining that the device is not legitimate in step S4 (S4: NO), the determining unit 177 stops the transmission process and the reception process of the OM 130 and the ODM 140 (step S6). This is to prevent illegitimate access to the vehicles 10 because a legitimate access right to the distance measuring device 100A is not owned.

Next, the determining unit 177 notifies the phase measuring unit 178 and the distance measuring unit 179 that the device is not legitimate (step S7).

When the phase measuring unit 178 and the distance measuring unit 179 are notified that the device is not legitimate, the process is ended without measuring the phase for the distance measuring and performing the distance measuring. In this case, a high-level device (an ECU configured to manage the vehicle 10 or the like) of the distance measuring device 100A and the wireless device 100R are notified that access has been made from the illegitimate device, and the doors of the vehicle 10 cannot be unlocked, the ignition switches cannot be switched on, and the like.

Next, the determining unit 177 stops the determination process (step S8). All the processing is stopped because the device is accessed by an illegitimate device. In this case, the process is stopped without returning to the start. Here, for example, the process may be recoverable when the signal of the legitimate device is received and the device is determined to be the legitimate device after the stop.

As described above, the difference calculating unit 176 obtains the first difference of the phase of the transmission signal and calculates the second difference of the phase of the reception signal, and the determining unit 177 compares the first difference and the second difference to determine the legitimacy of the signal. Therefore, a case where the phase of the reception signal is sharply changed by the EDLC can be determined.

Therefore, the wireless device 100R that can detect a relay attack of changing the phase of the reception signal and impersonating a legitimate device, and a method for controlling the wireless device 100R can be provided.

Additionally, the determining unit 177 continues the determination process in response to determining that the device is legitimate, and stops the determination process in response to determining that the device is not legitimate. The vehicle 10 can be prevented from being accessed by an illegitimate device and being illegitimately used.

Additionally, the determining unit 177 stops the determination process and stops the transmission process and the reception process of the OM 130 and the ODM 140 in response to determining that the device is not legitimate, thereby preventing illegitimate access to the vehicle 10.

Additionally, because the phase is used as the predetermined physical quantity of the transmission signal and the reception signal, an illegitimate device can be found based on the phase difference when an illegitimate operation of changing the phase of the reception signal sharply is performed as in the EDLC.

Although the wireless device and the method for controlling the wireless device according to the exemplary embodiments of the present disclosure have been described above, the present disclosure is not limited to the specifically disclosed embodiments, and various modifications and changes can be made without departing from the scope of the claims.

What is claimed is:

1. A wireless device comprising:

a transmitter;

a receiver; and a control device configured to obtain a first difference of a predetermined physical quantity, in a unit time, of a predetermined-frequency signal transmitted by the transmitter to another device, and calculate a second difference of the predetermined physical quantity, in the unit time, of the predetermined-frequency signal received by the another device, based on a signal received by the receiver; and perform a determination process of comparing the first difference and the second difference to determine legitimacy of the signal received by the receiver.

2. The wireless device as claimed in claim 1, wherein the control device continues the determination process in response to determining that the signal received by the receiver is legitimate, and stops the determination process in response to determining that the signal received by the receiver is not legitimate.

3. The wireless device as claimed in claim 2, wherein the control device stops the determination process in response to determining that the signal received by the receiver is not legitimate, and stops a transmission process and a reception process of the transmitter and the receiver.

4. The wireless device as claimed in claim 1, wherein the predetermined physical quantity is a phase of the signal.

5. The wireless device as claimed in claim 1, wherein the control device is further configured to switch between a transmission state in which the transmitter transmits the predetermined-frequency signal and a reception state in which the receiver receives the signal.

6. The wireless device as claimed in claim 1, wherein the first difference of the predetermined physical quantity is a first difference between two consecutive sampling periods in the unit time, and the second difference of the predetermined physical quantity is a second difference between two consecutive sampling periods in the unit time.

7. The wireless device as claimed in claim 1, wherein the control device is configured to calculate a correlation between the first difference and the second difference, and determine that the signal received by the receiver is legitimate when a maximum value of the correlation is greater than or equal to a threshold value.

8. A method for controlling a wireless device including a transmitter, a receiver, and a control device configured to obtain a first difference of a predetermined physical quantity, in a unit time, of a predetermined-frequency signal transmitted by the transmitter to another device, and calculate a second difference of the predetermined physical quantity, in the unit time, of the predetermined-frequency signal received by the another device, based on a signal received by the receiver, the method comprising comparing the first difference and the second difference to determine legitimacy of the signal received by the receiver.

* * * * *